US010579423B2

(12) United States Patent
Li et al.

(10) Patent No.: US 10,579,423 B2
(45) Date of Patent: Mar. 3, 2020

(54) RESOURCE SCHEDULING USING MACHINE LEARNING

(71) Applicant: Microsoft Technology Licensing, LLC, Redmond, WA (US)

(72) Inventors: Jinchao Li, Redmond, WA (US); Yu Wang, Redmond, WA (US); Karan Srivastava, Seattle, WA (US); Jianfeng Gao, Woodinville, WA (US); Prabhdeep Singh, Newcastle, WA (US); Haiyuan Cao, Redmond, WA (US); Xinying Song, Bellevue, WA (US); Hui Su, Bellevue, WA (US); Jaideep Sarkar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 15/943,206

(22) Filed: Apr. 2, 2018

(65) Prior Publication Data
US 2019/0303197 A1 Oct. 3, 2019

(51) Int. Cl.
G06F 9/46 (2006.01)
G06F 9/48 (2006.01)
G06K 9/62 (2006.01)
G06F 9/50 (2006.01)
G06N 20/00 (2019.01)

(52) U.S. Cl.
CPC .......... *G06F 9/4881* (2013.01); *G06F 9/5005* (2013.01); *G06K 9/6217* (2013.01); *G06N 20/00* (2019.01)

(58) Field of Classification Search
CPC ..... G06F 9/4881; G06N 20/00; G06K 9/6217
See application file for complete search history.

(56) References Cited

U.S. PATENT DOCUMENTS

2011/0219031 A1* 9/2011 Chi .................. G06F 16/00
707/770

* cited by examiner

Primary Examiner — Camquy Truong
(74) Attorney, Agent, or Firm — Schwegman Lundberg & Woessner, P.A.

(57) ABSTRACT

Generally discussed herein are devices, systems, and methods for scheduling tasks to be completed by resources. A method can include identifying features of the task, the features including a time-dependent feature and a time-independent feature, the time-dependent feature indicating a time the task is more likely to be successfully completed by the resource, converting the features to feature values based on a predefined mapping of features to feature values in a first memory device, determining, by a gradient boost tree model and based on a first current time and the feature values, a likelihood the resource will successfully complete the task, and scheduling the task to be performed by the resource based on the determined likelihood.

20 Claims, 5 Drawing Sheets

RESOURCE SCHEDULING USING MACHINE LEARNING

BACKGROUND

Resource scheduling is a challenging task that includes tradeoffs. For example, a resource scheduled to perform a task at time A, is not available to perform a different task at the same time. In another example, the time it takes for a resource to perform a task can limit a number of tasks fulfilled by the resource. Consider a resource that takes six minutes to perform a task, it cannot be scheduled to perform a task at a first time and a second task at five minutes after the first time, because it will not be available for another minute. Further yet, resources can be scarce and the number of tasks to be performed can be more than the scarce resources can handle. The resources can be insufficient to complete tasks to be performed in such circumstances, and thus some prioritization of tasks can help accomplish a task that is more important than another task.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A scheduler system to determine a schedule can include at least one memory device, processing circuitry coupled to the at least one memory device, the processing circuitry to identify features of a task, the features including a time-dependent feature and a time-independent feature, the time-dependent feature indicating a time the task is more likely to be successfully completed by a resource, convert the features to feature values based on a predefined mapping (e.g., one-to-one mapping) of features to feature values in a first memory device of the at least one memory device, determine, by a supervised machine learning model and based on a first current time and the feature values, a likelihood the resource will successfully complete the task, and schedule the task to be performed by the resource based on the determined likelihood.

A machine-readable medium can include instructions that, when executed by a machine, configure the machine to perform operations of a sales lead call scheduler, the operations comprising identifying features of a task, the features including a time-dependent feature and a time-independent feature, the time-dependent feature indicating a time between a current time and time a sales lead was identified, converting the features to feature values based on a predefined mapping of features to feature values in a first memory device, determining, using a supervised machine learning model and based on a first current time and the feature values, a likelihood the resource will successfully complete the task, and scheduling the task to be performed by the resource based on the determined likelihood.

A method of scheduling a resource to perform a task by a scheduler system, the method comprising identifying features of the task, the features including a time-dependent feature and a time-independent feature, the time-dependent feature indicating a time the task is more likely to be successfully completed by the resource, converting the features to feature values based on a predefined mapping of features to feature values in a first memory device, determining, by a gradient boost tree model and based on a first current time and the feature values, a likelihood the resource will successfully complete the task, and scheduling the task to be performed by the resource based on the determined likelihood.

DETAILED DESCRIPTION

Figure 1:
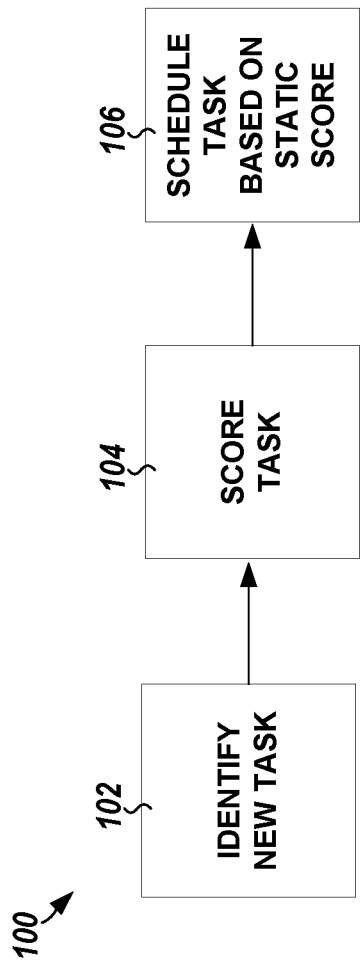
FIG. 1 illustrates, by way of example, a diagram of a prior scheduling method.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

A problem for computer-implemented scheduling, beyond those previously discussed in the BACKGROUND, includes a lack of ability to adjust the schedule in real time, near real time, or the like. Schedules are often created and then implemented some time later. Schedules often govern resource allocation and task performance for a period of time after deployment of the schedule. These lag times between creation and implementation fail to account for changes in priority of a resource or a priority of a task that has changed, or some unforeseen circumstance between the creation of the schedule and the implementation of the schedule. Thus, resulting in a non-optimal resource allocation or non-optimal task management.

To overcome this lag problem, embodiments include multiple memories that are populated with different data. The different data of respective memories can include different time sensitivity, such as high time sensitivity, new data without time sensitivity, and historic data that has been previously considered by the scheduler. The memory that includes data with time sensitivity can have less access time lag than other memories with different time sensitivity. The time sensitivity of data can be determined based on a policy that defines a condition that, when met by the data, indicates that data is to be stored to the respective memory. With this structure, data that is likely to alter the relative priorities of the tasks can be stored in a memory with high time sensitivity. This high time sensitivity memory can be local to components of the scheduler, such that accessing the memory has very low or minimal latency. The scheduler can then alter the priorities in accord with the data and push a new schedule to the resources with less time delay.

Another problem with implementing a scheduler system using machine learning includes computational lag time. Some of the computational lag time is from feature vector generation. To help reduce the lag in computing the feature vector, embodiments can include separate feature extraction and feature vector value conversion ("featurization") operations. Feature extraction retrieves data of interest. Featurization converts the extracted data to a value that can be scored by the model and ultimately used by the scheduler. The featurization can be implemented using a lookup table (LUT) or other mapping (e.g., one-to-one mapping) of data to feature values. The featurization step in machine learning is usually performed by one or more encoding layers of neurons in a neural network (NN). However, using the mapping is faster than the encoding NN and allows the NN to consume fewer compute resources and produce a score, and a resulting schedule faster.

Another problem with scheduling using machine learning includes model drift. As schedule needs, resource availability, and task importance evolves, the model can become inaccurate in scoring priority of a task. To help ensure accuracy of the model, embodiments can include one or more model evaluators. A first model evaluator can be implemented online and predict accuracy of the model and a second model evaluator can be implemented offline and provide a more resource intensive prediction of model accuracy. The first model evaluator can provide an indication that the model can benefit from re-training and the second model evaluator can make a determination whether the model is to be re-trained, such as in response to the first model evaluator providing the indication. In this manner, model evaluation can be monitored in near real-time and updated, such as only when necessary.

As previously discussed, some tasks are time-sensitive, such that completion of the task is more likely successful if performed within a time window and less likely successful is performed outside the time window. There are occasions in which the time window or likelihood of success is only known after schedule deployment. Schedules that do not account for this time dependency can cause the schedule to less optimal than a schedule that accounts for the time dependency.

To overcome these tradeoffs, some schedulers prioritize tasks and/or resources with static priority values. Tasks with higher priority are placed on the schedule before tasks with lower priority. Resources with higher priority can be scheduled to perform higher priority tasks than resources with lower priority. These schedules fail to account for the time-of-day-sensitivity mentioned previously and to account for changing resource availability and increased knowledge regarding the task or the resource. Embodiments can account for this time sensitivity by including a time-dependent feature in a feature vector considered by the model.

As previously discussed, embodiments herein can help overcome one or more of the problems of prior scheduling systems. The embodiments can update the schedule in response to a predefined condition being met. The schedule update can help avoid using a higher priority resource for a lower priority task or foregoing performing a higher priority task for a lower priority task. The embodiments can accomplish this by monitoring parameters that affect the schedule, such as a parameter that affects a priority of a task, a priority or availability of a resource, or the like. Embodiments herein can help schedule and deploy the time-sensitive tasks, such as by altering a priority of the tasks to increase the likelihood of success in accomplishing the task. Embodiments herein can employ a supervised machine learning technique, such as a gradient boost tree model, to update a priority of a schedule or a resource. The schedule can be updated based on the updated priority.

Reference will now be made to the FIGS. to describe more details regarding prior and improved scheduling systems, devices, methods, and machine-readable media.

FIG. 1 illustrates, by way of example, a diagram of a prior scheduling method 100. The method 100 as illustrated includes identifying a new task, at operation 102; scoring the task, at operation 104; and scheduling the task based on the static score, at operation 106. The score of the task, as determined at operation 104, can determines the order in which the tasks are scheduled at operation 106. For example, a task with a higher score can be scheduled to be performed before a task with a lower score. In the method 100, the schedule is not updated in consideration of intervening events that affect the score of the task. The schedule is not updated if new knowledge is obtained regarding the scheduled task. The schedule is only updated upon identification of a new task. The update only includes adding the task to the schedule and not re-determining the score of tasks already on the schedule. In the method 100, the score is static and unchanging, thus making the relative importance of tasks to each other static and time independent. Once a task is determined to have a lower score than another task, using the method 100, the task will always have a lower score than that task.

Figure 2:
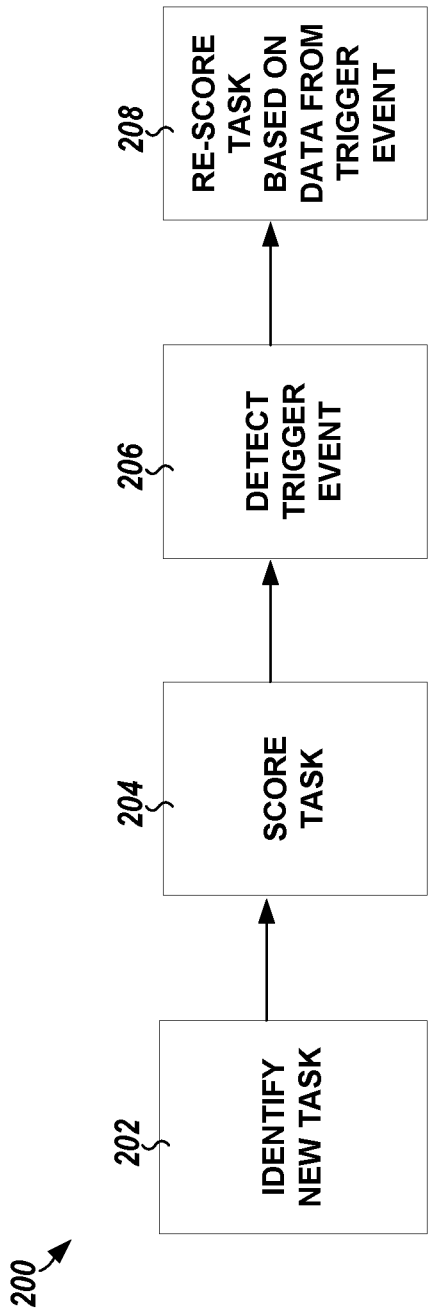
FIG. 2 illustrates, by way of example, a diagram of an embodiment of an improved method for scheduling.

FIG. 2 illustrates, by way of example, a diagram of an embodiment of an improved method 200 for scheduling. The method 200 as illustrated includes identifying a new task, at operation 202; scoring the identified task, at operation 204; detecting a trigger event, at operation 206; and re-scoring one or more task(s) based on data from the trigger event, at operation 208. The trigger event, at operation 206, can include receiving new data regarding a task, a specified period of time elapsing, or the like. The method 200, in contrast to the method 100, accounts for events (e.g., passage of time, time of day, day of the week, month of the year, new data regarding a task or resource, or the like) that occur after task scoring, and updates the score of the task accordingly. The method 200 allows for scores of a task or a task-resource pair to change (to increase or decrease in value) even after a schedule is deployed.

A score of a task-resource pair can indicate how well the task can be met by the resource. For example, in a context of a call center, consider a task of calling an 85-year-old person to determine their interest in and likelihood of purchasing a product. A caller (e.g., resource) that is 20 may not be able to relate to the 85-year-old as well as a 60-year-old. Thus, the 60-year-old can include a higher task-resource score than the 20-year-old.

The method 200 can be accomplished using one or more unique feature vectors, a unique system, a unique machine-learning application, a unique activity detection device, or other unique device, system, method, or machine-readable medium.

While the following FIGS. describe scheduling in the context of sales lead call scheduling, it will be appreciated that embodiments have application beyond call scheduling. For example, embodiments can be used in applications such as task management in a manned, autonomous, or a combination thereof network of devices (e.g., satellites, unmanned aerial vehicles (UAVs), sensors, internet of things (IoT) devices, computing devices, vehicles (e.g., airplanes, cars, trucks, boats, motorcycles, military vehicles, or the like), or the like.

Figure 3:
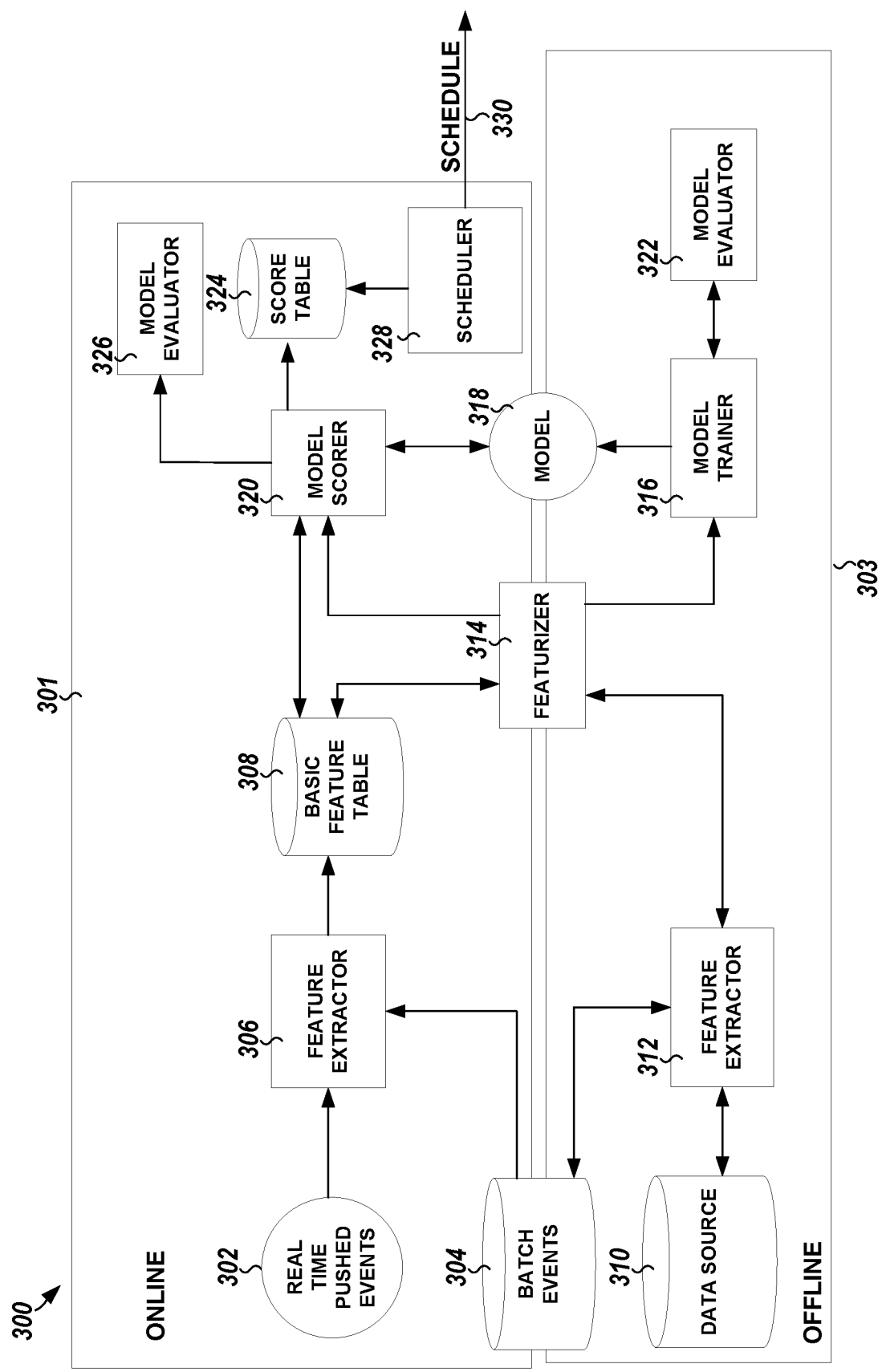
FIG. 3 illustrates, by way of example, a diagram of an embodiment of a scheduling system.

FIG. 3 illustrates, by way of example, a diagram of an embodiment of a scheduling system 300. The system 300 as illustrated includes components and operations that perform online 301 and components and operations that perform offline 303.

The online 301 components and operations include real-time pushed events 302, batch events database 304 (which can perform operations online, offline, or both), an online feature extractor 306, a basic feature table 308, a featurizer 314 (which can perform operations online, offline or both), a model 318 (which can perform operations online, offline, or both), a model scorer 320, a score table 324, an online model evaluator 326, and a scheduler 328.

The offline 303 components and operations include the batch events database 304, a data source database 310, an offline feature extractor 312, the featurizer 314, a model trainer 316, the model 318, and an offline model evaluator 322. The feature extractors 306 and 312 can be the same or different components of the system 300. They are illustrated as split to indicate that data from the batch events database 304 can be processed online, offline, or a combination thereof.

Online means during operation hours of a call-center in the context of call scheduling. In general, online means when a network or system is available for user access. Offline means the times at which the system or network governed by a schedule 330 is not online. Model evaluation can occur both online and offline. Model serving and tracking can occur online, and model training can occur offline.

The real time pushed events 302, the batch events database 304, and the data source database 310 can include similar types of data from different time windows. The real time pushed events 302 can include data from events that satisfy a specified condition. The real time pushed events 302 includes data from events that are known to be time-sensitive or be known to affect a determined likelihood of a task priority. Time-sensitive events, in the context of a product call-center scheduler, can include discovery of a new lead, data indicating that an existing lead has expressed further interest in a product, or the like. For example, the real-time pushed events can be from a web server that detected traffic by the lead on a website regarding products or services, a device on a same or different network as the feature extractor indicating that the lead has been contacted (e.g., by marketing personnel) or has contacted marketing personnel or other personnel associated with a product or service, a queue that can be monitored for data with a lead identification number, or the like. A trigger, such as a period of time elapsing or a condition being met, can be implemented that causes the data in the queue a database or the like, to be searched for new event data.

The batch events database 304 includes data regarding events that do not satisfy the specified condition but have occurred between the last time the model 318 was updated to a current time. The data source database 310 includes data regarding events prior to the last time the model 318 was updated. The data in the data source database 310 can be used for training the model 318 and providing supervision (e.g., input-output examples) to a supervised machine learning model.

The data regarding the events in the real-time pushed events 302, the batch events database 304, and the data source database 310 can include historical data from an electronic mail (email), phone call (e.g., whether seller finished phone call, time of day of phone call, phone call duration, disposition of phone call (e.g., connected, no answer, or wrong number), information regarding lead (e.g., historical phone call information, marketing interaction with lead, webinar attendance, whether marketing called lead, data from and whether lead used instant messenger (IM) to discuss with product support, whether used contacted company, whether lead authored an article regarding product, internet search data of the lead (e.g., whether the lead showed interest in some form, such as by downloading an image, visiting a website, searching for a product or a competing product or a seller, or the like), whether the lead contacted marketing, whether the lead sent or responded to an email, a time of any of the events, a time since the time of any of the events, a combination thereof, or the like.

As previously discussed, the feature extractors 306 and 312 can operate on same or different hardware and can include same or different instantiations of program code. The online feature extractor 306 and the offline feature extractor 312 can perform the same operations, but on different data. For example, the online feature extractor 306 can extract features of the real time pushed events 302 and the batch events database 304 while the offline feature extractor 312 extracts features of the batch events database 304 and the data source 310. The features extracted by the offline feature extractor 312 can include phone call features, lead information features, and marketing interaction features. The phone call features can include a lead identification (a number or character string that uniquely identifies the lead), a date the phone call was placed, a time the call started, a time the call ended, a disposition of the call, a description of the call (e.g., lead interested, lead not interested, or the like), a topic of the call (e.g., a product associated with the call), an identification of an operator receiving or placing the call. The lead information features can include the lead identification, a date the lead was created, a worldwide lead management response identification, a business phone number or other phone number of the lead, a company with which the lead is associated (employed or agent for), a country in which the lead is located, an email address of the lead, a name of the lead (e.g., first name, last name, middle name, etc.), a job title of an occupation of the lead, a tactic name associated with the lead (e.g., an indication of a way in which the lead was received and made of interest, such as a workshop, a database, a report, or the like), a status of the lead (e.g., whether the lead has been contacted previously, has agreed to purchase product, is considering purchasing product, or the like), a priority of the lead (e.g., a number indicating their priority relative to the other leads, high, medium, low, or the like), a combination thereof or the like. The marketing interaction features can include the email address of the lead, an activity type (e.g., marketing contacted lead, lead contacted marketing, phone contact, email contact, instant messenger contact, or the like), the activity date, an activity attribute (e.g., visit webpage, email bounced or received, interesting moment, or the like), an attribute value (e.g., the webpage visited, details of the email that was bounced or received, what interesting moment occurred, or the like), a combination thereof or the like.

The features extracted by the feature extractors 306 and 312 can be raw features (features as they are received), or textual versions of features (features after optical character recognition (OCR) or the like). The feature extractors 306 and 312 can extract the features in a variety of ways, such as can be dependent on a format of the data provided. For example, in a text file or other character-string file, a term frequency-inverse document frequency or bag of words technique can be used to determine important words in the file. The important words can be features. A parts of speech technique can be used to tag the characters in a file and extract characters that correspond to a specific part of speech. The feature extractors 306 or 312 can perform a feature hash on the features, such as to vectorize features into indices in a vector or matrix. In feature hashing, a hash function is applied to the respective features and the respective hash value is used an index to the feature in the feature vector or matrix. This contrasts with creating a dictionary and looking up indices in an associative array or the like. Such feature hashing consumes less processing power and memory as the dictionary is of fixed size and does not need to be adjusted like in the associative array.

The basic feature table 308 stores the features extracted by the online feature extractor 306. The basic feature table 308 can be a relational table, such as a structured query language (SQL) table or a non-relational table, such as a NoSQL database structure that can include a column, document, key-value, graph, multi-model or other structure. The basic feature table 308 can be indexed by the lead identification and can include one or more features for each lead identification that was received since a last iteration of model scoring (by the model scorer 320) or model updating (by the model trainer 316).

The featurizer 314 translates the features from the offline feature extractor 312 and the feature table 308 to a value that is in a form that is understandable by the model 318 or model scorer 320. The featurizer 314 can generate scoring-ready features based on the feature information from the feature table 308 or the offline feature extractor 312. The featurizer 314 can generate one or more time-dependent features for each lead. For example, a time-dependent feature can include a time difference between a scoring time (e.g., a current time) and a most engaged time (e.g., a time when a user is most likely to purchase a product). The time-dependent feature can be used, by the model 318 or the model scorer 320 to evaluate a lead quality change based on a scoring time. Thus, a score associated with a lead can change based on their most active time and the time difference between their most active time and the time at scoring.

One or more of the features can be translated using a word embedding technique, the feature number converted to an integer, or the like.

The featurizer 314 can perform a rule-based or machine-learned technique for generating feature values. The rule-based featurization can include a mapping of features to corresponding values. The mapping can be human-created. Table 1 represents a rule-based featurization.

TABLE 1

| INDEX, FEATURE | VALUE |
| --- | --- |
| I1, X1 | Y1 |
| I2, X2 | Y2 |
| I2, X3 | Y3 |
| I3, X4 | Y4 |
| I3, X5 | Y5 |

In Table 1, if feature with index I1 and characters X1 is received, the featurizer converts that index in the vector or matrix to Y1 (a binary word) that is understandable by the model or model scorer.

The featurizer 314 can generate feature vectors for each lead identification in the basic feature table 308, the batch events database 304, or the data source database 310, depending on the event that triggered the featurizer 314 to operate. For example, the featurizer 314 can update only the feature vectors of the lead identification(s) in the feature table 308 in response to a non-time-based condition being met. The non-time-based condition can include detecting a lead has visited a website, called, discusses a product on instant messenger or social media, or the like. In another example, the featurizer 314 can update all feature vectors of the lead identification(s) in the system in response to a time-based condition being met. The time-based condition can include a specified amount of time elapsing (e.g., five, ten, fifteen, twenty, thirty, fort-five, or sixty minutes, some duration therebetween, or a greater or lesser amount of time) since all feature vectors were last updated. Since the feature vector can include a feature that indicates the relative time between a current time and a time at which a user is most likely to respond to a caller, the feature vector can change between consecutive updates. The feature vector could additionally or alternatively change due to a new feature being added, or an already existing feature of a lead being modified since the last update was performed.

In response to detecting that a non-time-based condition has been met, the featurizer 314 can request features from the offline feature extractor 312 or retrieve features from the feature table 308 for a specified lead identification. The featurizer 314 can generate a feature vector for the lead identification. The feature vector can be used by the model trainer 316 or the model scorer 320. In response to detecting a time-based condition has been met, the featurizer 314 can request, for each lead identification indicated to be active (e.g., as indicated by one or more bits associated with the lead identification in the data source database 310, or the like) the data from the basic feature table 308 and the data source database 310. The featurizer 314 can provide each of the feature vectors to the model trainer 316 and the model scorer 320.

The feature vector provided, by the featurizer 314, to the model trainer 316 can be different from the feature vector provided to the model scorer 320. The feature vector provided to the model trainer 316 can include all features of the lead identification up to a last interaction with a resource. For example, if n calls have been placed to the lead, the feature vector to the model trainer 316 can include features from the first n−1 calls and the time of the $n^{th}$ call to determine the likely outcome of the $n^{th}$ call (as is represented by the score). The details of the $n^{th}$ call can represent the prediction to be made by the model 318. The details of the $n^{th}$ call can be used for determining an accuracy of the model. The feature vector provided to the model scorer 320 can include all features of all interactions with the lead (e.g., for all n calls).

In the embodiments of lead scoring, the score represents a likelihood of converting a lead to an opportunity. In general, a lead that has more activity (features) indicating interest in a product is more likely to be converted to an opportunity. This is not always the case, though, as a lead can indicate during a phone call that they are no longer interested, that they have already purchased a product that meets their needs, or the like, a lead that has more features does not always mean that the lead can be converted to an opportunity. Further, this distinction is not readily apparent to a human-observer and can be more readily identifiable by a trained machine. To help distinguish between the leads the are likely to become an opportunity and those that are less likely to become an opportunity a machine-learning technique can be employed. The machine-learning technique can generate the model 318 that is used by the model scorer 320 to generate the score table 324.

The model 318 in embodiments can be configured to determine a score for each lead. The score can be representative of a probability that the lead turns into a qualified opportunity. The score can be used to determine a schedule of leads to call. The model 318 can include a gradient boost tree model. A gradient boost tree model is a modification to a general gradient boosting technique that improves a fit of each base learner. Instead of fitting a single optimal value that minimizes a cost function for an entire tree, the gradient boost tree model chooses multiple values that minimizes the cost function with respect to respective regions of the tree. The size of three, number of terminal nodes, can be adjusted to determine the number of regions and the accuracy of the gradient boost tree technique.

The model 318 can receive, as input, a feature vector from the featurizer 314 and produce a score for each feature vector. After (e.g., in response to) an updated score from the model 318, a schedule can be updated to reflect the updated score. The model 318 can consider a difference between a current time and a time the lead is most likely to become an opportunity. Thus, the score produced by the model 318 can be time-dependent.

The model 318 can be trained by the model trainer 316. As previously discussed, the model trainer 316 receives or produces a training feature vector that can be different than the feature vector that is used for scoring. The model trainer 316 can update the model 318 based on feedback from the model evaluators 322 or 326. The model trainer 316 can train the model 318 based on a moving window of feature vector data or an increased history of feature vector data. For example, the model trainer 316 can use the feature vector data from the last day, week, month, year, etc. or some time frame in between in training the model 318.

The model 318 can be trained at an event level (e.g., a phone call or other lead interaction with personnel). A change in information associated with a lead can be used as an updated training sample. For example, if a lead has a history of four phone calls, each record will make a training sample using all lead information until that point, while not including information about the current call except the timestamp of the call, which is used to derive time associated feature. The label output from the model 318 can be a final qualify/disqualify status for the lead (e.g., a probability indicating a likelihood that the lead will become an opportunity or not).

Operation of the model 318 can be triggered by a phone call being placed by a resource, a phone call being received from the lead, an email being received from the lead, or a marketing interaction event (e.g., a lead attending a webinar, an in-person seminar, a click-event, or the like). The condition can include a specified period of time elapsing since the scores were last updated.

The offline model evaluator 322 can perform a same or different technique for model evaluation as the online model evaluator 326. The online model evaluator 326 can perform an evaluation technique that is less expensive in terms of computational cycles or time required as compared to that performed by the online model evaluator 326. The model evaluators 322 or 326 can monitor an area under curve (AUC) of the model 318 as compared to an offline model, statistics such as qualify/disqualify rate, a total number of leads, average number of phone calls, average lead quality (e.g., number of leads that are hot, warm, or cold, such as can be determined by different ranges of scores in which hot has a higher average score than warm, which has a higher average score than cold). The model evaluators 322 or 326 can track a distribution of the leads created and compare the determined distribution to a target or known distribution of leads to determine if the model 318 can be re-trained to achieve a distribution.

Tracking the data distribution/metrics can help avoid concept drift. Concept drift is a phenomenon that occurs when the relationship between a target feature and a descriptive feature changes over time. For example, in the example of a call center, a search qualified opportunity (SQO) rate for the beginning of a quarter can be different from the SQO rate at the end of each quarter. This metric can be tracked and used to determine if model re-training/fitting can be helpful or which model can better fit.

In some embodiments, the model evaluators 322 or 326 can perform a A/B testing on results to determine whether the model 318 can benefit from re-training. The model evaluators 322 or 326 can cause the model trainer 316 to initiate re-training of the model 318 in response to determining the model 318 is not sufficiently tracking the distribution, the A/B test indicates the model 318 can benefit from re-training, the statistics have changed by a threshold percentage, or the like.

In general, we use AUC (area under curve) can be used as a receiver operating characteristic (ROC) curve and a precision recall (PR) curve to evaluate the accuracy of the model. If the AUC falls below some predetermined threshold, the model can be re-trained, replaced by a more accurate model, or the like. The trade-off between precision and recall and the threshold that corresponds to a sufficiently accurate model (as determined by the AUC) is application specific. In the context of a call center, a higher recall can be valued more than a higher precision. Missing a possible lead is more damaging than calling an uninterested person.

A/B testing, sometimes called bucket testing or split-run testing is an experiment with two variables A and B. A/B testing provides a way to test two versions of a variable, for example A, against another variable, B. More details regarding the A/B testing are provided in FIG. 4.

The model scorer 320 can convert an output of the model 318 to a score understandable by a scheduler 328. The model scorer 320 can initiate operation of the model 318 and provide input for which the model 318 is to produce a score.

The model scorer 320 can associate data from the basic feature table 308, such as the lead telephone number, lead identification, lead name, a product the lead is interested in, or the like from the basic feature table 308. The score and associated data can be stored in the score table 324. The data in the score table 324 can be used by the scheduler 328 to produce a schedule. In a scoring phase, features are constructed based on all past information with time associated feature derived from scoring time. For at least this reason, feature extraction can be split between online and offline.

The scheduler 328 can form the schedule used by personnel to make phone calls to leads. The scheduler 328 can distribute the schedule to individual resources. In embodiments of a call-center, the resources can include networked computers that can monitor and record data regarding phone calls made by personnel. In embodiments of a network of autonomous or manned devices, the resources that receive the schedule can include the networked devices or a subset of the networked devices. In either of the embodiments, the scheduler 328 can distribute the schedule to the networked devices itself or through an intermediate device.

The schedule 330 produced by the scheduler 328 can indicate a time or order to use a resource to perform a task. The schedule 330 can include data from the score table 324, such as to aid the resource in performing the task.

Figure 4:
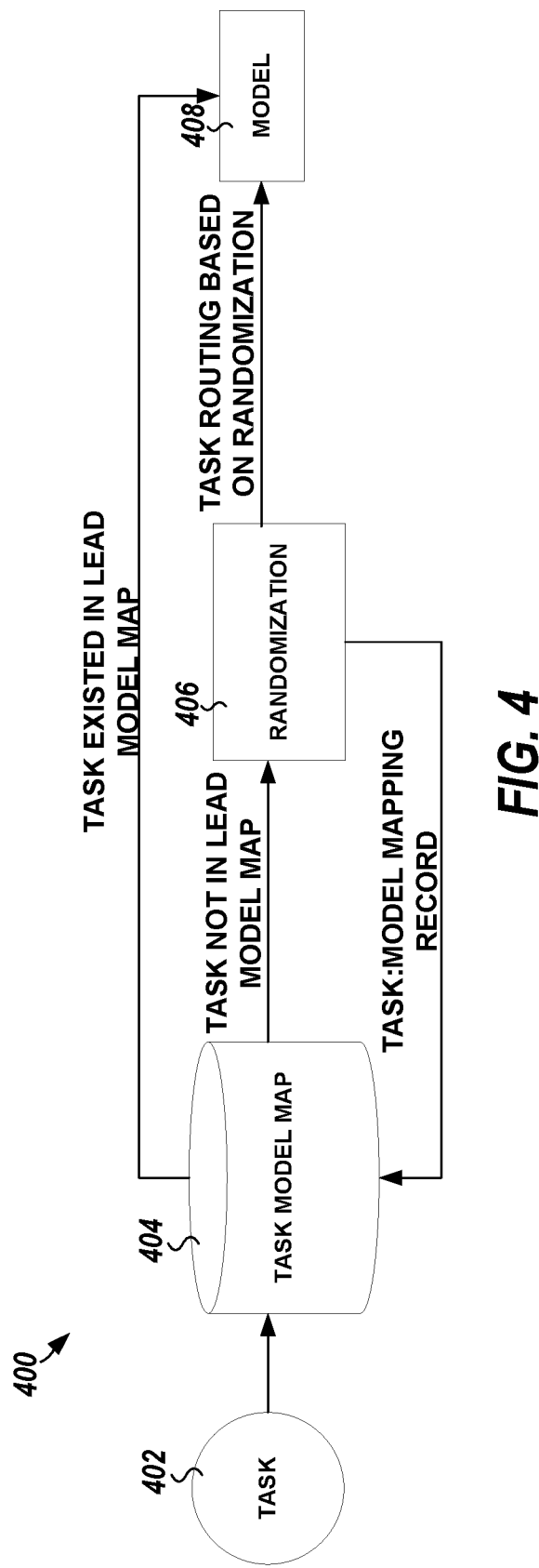
FIG. 4 illustrates, by way of example, a diagram of an embodiment of an A/B testing system for model evaluation, such as can be performed by a model evaluator of FIG. 3.

FIG. 4 illustrates, by way of example, a diagram of an embodiment of an A/B testing system 400 for model evaluation, such as can be performed by the model evaluators 322 and 326. The A/B testing system 400 as illustrated includes receiving a task identification 402 of a task received at the real time pushed events 302 or the batch events 304. The model evaluators 322 or 326 can determine whether the task identification is new, by determining whether the task identification exists in the task model map database 404. If the task identification is stored in the task model map database 404, the task has already been allocated to a model, and that model can be rerun or re-trained based on the newly received data. If the task identification 402 is not in the task model map database 404 the task identification 402 can be assigned (e.g., randomly using a randomization technique, such as hashing based on task identification 402 or the like) to a model of a plurality of models (for testing or verification purposes). The results of the mapping can be stored in the task model map database 404 so that future instances of the task identification 402 do not need to be mapped. The model 408 is a plurality of models that can be used in A/B testing. The model 408 can include the model 318, a static scoring model, or different variants thereof.

Prior to performing A/B testing, A/A testing can be performed for a period to guarantee that data between A and B have a sufficiently similar statistical distribution. In A/B testing, new tasks can be randomly assigned to an experiment group (e.g., model 1) or a control group (e.g., model 2), and scored by static model and dynamic model, respectively. A database table (e.g., the task model map database 404) can record the task and model mapping. Tasks, in embodiments, are generally re-scored by the same models to which they are assigned (for evaluation purposes). Note that this is a scoring that is separate from the scoring provided by the model 318 for scheduling.

In static lead scoring, there is only one score for each lead, whereas in dynamic lead scoring, each lead has several scores during life time. To compare these two models, there are two approaches for measurement. One is to use the last score in dynamic lead scoring as it reflects lead quality when the final qualify/disqualify decision is made, which essentially is the most important ranking during lead's life time. The other method is to take an average value of dynamic lead scores for each lead (or duplicate the lead score for static lead scoring) for comparison. More model evaluations can be made including but not restricted to analyzing improved score versus increased events.

Figure 5:
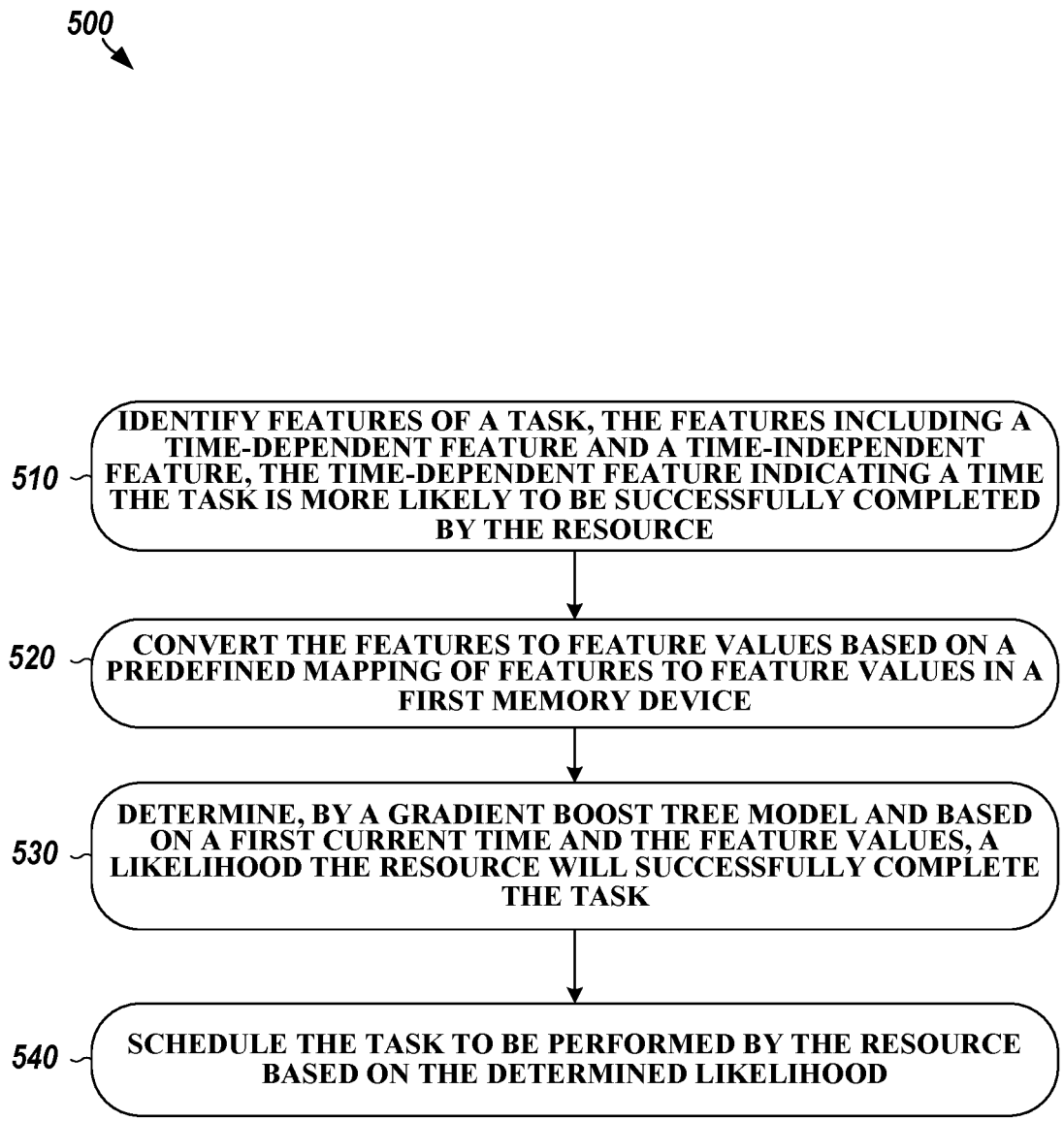
FIG. 5 illustrates, by way of example, a diagram of an embodiment of an improved method for task and resource scheduling.

FIG. 5 illustrates, by way of example, a diagram of an embodiment of a method 500 for task scheduling. The method 500 can be performed by one or more components of a scheduler system, such as one or more components of the system 300 or 400. The method 500 as illustrated includes identifying features of the task, the features including a time-dependent feature and a time-independent feature, the time-dependent feature indicating a time the task is more likely to be successfully completed by the resource, at operation 510; converting the features to feature values based on a predefined mapping of features to feature values in a first memory device, at operation 520; determining, by a gradient boost tree model and based on a first current time and the feature values, a likelihood the resource will successfully complete the task, at operation 530; and scheduling the task to be performed by the resource based on the determined likelihood, at operation 540.

The method 500 can further include evaluating, by an offline technique, whether the machine learning model is generating sufficiently accurate predictions of likelihood. The method 500 can further include evaluating, by an online technique, whether the machine learning model is generating sufficiently accurate predictions of likelihood, the offline technique different from the online technique. The method 500 can further include, wherein the scheduler system includes first, second, and third memory devices, the first memory device including feature values that represent values of respective features based on a predefined mapping of features to feature values stored thereon, the second memory device including data stored received during the specified period of time stored thereon, and the third memory device including historical data stored thereon that was generated before the data stored on the second memory device was generated. The method 500 can further include, in response to a determination by the first technique or the second technique that the machine learning model is not generating sufficiently accurate predictions of likelihood, re-training the machine learning model based on data from the first, second, and third memory devices.

The method 500 can further include determining a specified amount of time has elapsed since the task was last scored, and to re-determine the likelihood the resource will successfully complete the task, the likelihood re-determined by the machine learning model based on a second current time and the feature values. The method 500 can further include receiving an indication, at a time before the specified amount of time has elapsed, that a new feature for the task is available. The method 500 can further include re-determining the likelihood the resource will successfully complete the task, the likelihood re-determined by the machine learning model based on a third current time, the feature values, and a feature value for the new feature.

The method 500 can further include in response to a determination that a specified period of time has elapsed, accessing data stored in the second memory device during the specified period of time. The method 500 can further include extracting second features from the accessed data and store the second features in the first memory device. The method 500 can further include, wherein the schedule is a call schedule for sales call resources to place calls to product sales leads.

The method 500 can further include, wherein the features include phone call features indicating lead information features gathered on prior calls placed to the product sales leads, the lead information features indicating information of the product sales leads. The method 500 can further include, wherein the phone call features include a lead identification that uniquely identifies the lead, a date a phone call was placed, a time the phone call started, a time the phone call ended, a disposition of the phone call, a description of the phone call, a topic of the phone call, and an identification of an operator receiving or placing the phone call. The method 500 can further include, wherein the lead information features include the lead identification, a date the lead was created, business phone number or other phone number of the lead, a company with which the lead is associated, a country in which the lead is located, an email address of the lead, a name of the lead, a job title of an occupation of the lead, a tactic name associated with the lead, a status of the lead, and a priority of the lead.

Figure 6:
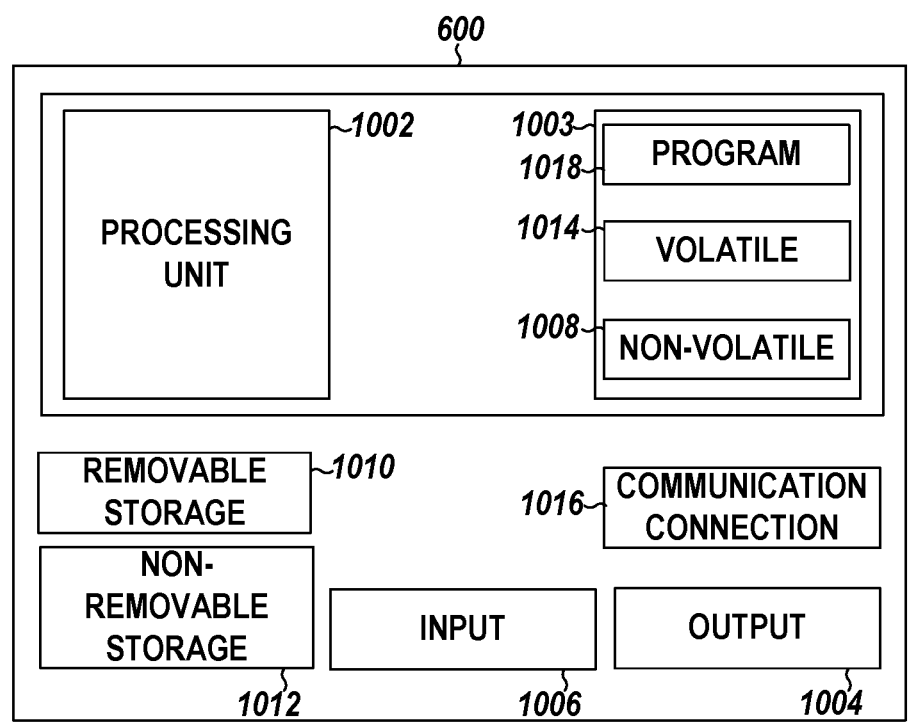
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One example machine 600 (in the form of a computer), may include a processing unit 1002, memory 1003, removable storage 1010, and non-removable storage 1012. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 1003 may include volatile memory 1014 and non-volatile memory 1008. The machine 600 may include— or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 600. A hard drive, CD-ROM, and RAM are some examples of articles including a non-transitory computer-readable medium such as a storage device. For example, a computer program 1018 may be used to cause processing unit 1002 to perform one or more methods or algorithms described herein.

Additional Notes and Examples

Example 1 includes a scheduler system to determine a schedule, the scheduler system comprising at least one memory device, processing circuitry coupled to the at least one memory device, the processing circuitry to identify features of a task, the features including a time-dependent feature and a time-independent feature, the time-dependent feature indicating a time the task is more likely to be successfully completed by a resource, convert the features to feature values based on a predefined mapping of features to feature values in a first memory device of the at least one memory device, determine, by a supervised machine learning model and based on a first current time and the feature values, a likelihood the resource will successfully complete the task, and schedule the task to be performed by the resource based on the determined likelihood.

In Example 2, Example 1 may further include, wherein the processing circuitry is further to determine a specified amount of time has elapsed since the task was last scored, and to re-determine the likelihood the resource will successfully complete the task, the likelihood re-determined by the machine learning model based on a second current time and the feature values.

In Example 3, Example 2 may further include, wherein the processing circuitry is further to receive an indication, at a time before the specified amount of time has elapsed, that a new feature for the task is available, and re-determine the likelihood the resource will successfully complete the task, the likelihood re-determined by the machine learning model based on a third current time, the feature values, and a feature value for the new feature.

In Example 4, at least one of Examples 2-3 may further include, wherein the at least one memory device includes a second memory device, and the processing circuitry is further to in response to a determination that a specified period of time has elapsed, access data stored in the second memory device during the specified period of time, and extract second features from the accessed data and store the second features in the first memory device.

In Example 5, at least one of Examples 1-4 may further include, wherein the processing circuitry is further to evaluate, by a first technique and while the scheduler system is offline, whether the machine learning model generates sufficiently accurate predictions of likelihood.

In Example 6, Example 5 may further include, wherein the processing circuitry is further to evaluate, by a second technique and while the scheduler system is online, whether the machine learning model generates sufficiently accurate predictions of likelihood, the second technique different from the first technique.

In Example 7, Example 6 may further include a third memory device including historical data stored thereon that was generated before the data stored on the second memory device was generated, and wherein the processing circuitry is further to, in response to a determination by the first technique or the second technique that the machine learning model does not generate sufficiently accurate predictions of likelihood, re-train the machine learning model based on data from the first, second, and third memory devices.

In Example 8, at least one of Examples 1-7 may further include a fourth memory device including the likelihood indexed by task identification stored thereon, the fourth memory device local to the processing circuitry.

In Example 9, at least one of Examples 1-8 may further include, wherein the schedule is a call schedule for sales call resources to place calls to product sales leads.

In Example 10, Example 9 may further include, wherein the features include phone call features indicating lead information features gathered on prior calls placed to the product sales leads, the lead information features indicating information of the product sales leads.

In Example 11, Example 10 may further include, wherein the phone call features include a lead identification that uniquely identifies the lead, a date a phone call was placed, a time the phone call started, a time the phone call ended, a disposition of the phone call, a description of the phone call, a topic of the phone call, and an identification of an operator receiving or placing the phone call, and the lead information features include the lead identification, a date the lead was created, business phone number or other phone number of the lead, a company with which the lead is associated, a country in which the lead is located, an email address of the lead, a name of the lead, a job title of an occupation of the lead, a tactic name associated with the lead, a status of the lead, and a priority of the lead.

In Example 12, at least one of Examples 1-11 may further include, wherein the machine learning model includes a gradient boost tree model.

Example 13 includes a (non-transitory) machine-readable medium including instructions that, when executed by a machine, configure the machine to perform operations of a sales lead call scheduler, the operations comprising identifying features of a task, the features including a time-dependent feature and a time-independent feature, the time-dependent feature indicating a time between a current time and time a sales lead was identified, converting the features to feature values based on a predefined mapping of features to feature values in a first memory device, determining, using a supervised machine learning model and based on a first current time and the feature values, a likelihood the resource will successfully complete the task, and scheduling the task to be performed by the resource based on the determined likelihood.

In Example 14, Example 13 can further include, wherein the operations further include determining a specified amount of time has elapsed since the task was last scored and re-determining the likelihood the resource will successfully complete the task, the likelihood re-determined by the machine learning model based on a second current time and the feature values.

In Example 15, Example 14 can further include, wherein the operations further include receiving an indication, at a time before the specified amount of time has elapsed, that a new feature for the task is available, and re-determining the likelihood the resource will successfully complete the task, the likelihood re-determined using the machine learning model based on a third current time, the feature values, and a feature value for the new feature.

In Example 16, at least one of Examples 14-15 can further include, wherein the operations further comprise in response to determining a specified period of time has elapsed, access data stored in the second memory device during the specified period of time, and extract second features from the accessed data and store the second features in the first memory device.

Example 17 includes a machine-readable medium including instructions that, when executed by a machine, configure the machine to perform operations of the processing circuitry of at least one of Examples 1-12.

Example 18 includes a method of scheduling a resource to perform a task by a scheduler system, the method comprising identifying features of the task, the features including a time-dependent feature and a time-independent feature, the time-dependent feature indicating a time the task is more likely to be successfully completed by the resource, converting the features to feature values based on a predefined mapping of features to feature values in a first memory device, determining, by a gradient boost tree model and based on a first current time and the feature values, a likelihood the resource will successfully complete the task, and scheduling the task to be performed by the resource based on the determined likelihood.

In Example 19, Example 18 can further include evaluating, by an offline technique, whether the machine learning model is generating sufficiently accurate predictions of likelihood.

In Example 20, Example 19 can further include evaluating, by an online technique, whether the machine learning model is generating sufficiently accurate predictions of likelihood, the offline technique different from the online technique.

In Example 21, Example 20 can further include, wherein the scheduler system includes first, second, and third memory devices, the first memory device including feature values that represent values of respective features based on a predefined mapping of features to feature values stored thereon, the second memory device including data stored received during the specified period of time stored thereon, and the third memory device including historical data stored thereon that was generated before the data stored on the second memory device was generated, and the method further includes, in response to a determination by the first technique or the second technique that the machine learning model is not generating sufficiently accurate predictions of likelihood, re-training the machine learning model based on data from the first, second, and third memory devices.

Example 22 includes a method to perform operations of the system of at least one of Examples 1-12.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A scheduler system to determine a schedule, the scheduler system comprising:
 at least one memory device;
 processing circuitry coupled to the at least one memory device, the processing circuitry to:
  identify features of a task, the features including a time-dependent feature and a time-independent feature, the time-dependent feature indicating a time the task is more likely to be successfully completed by a resource;
convert the features to feature values based on a predefined mapping of the features to feature values in a first memory device of the at least one memory device;
determine, by a supervised machine learning model and based on a first current time and the feature values, a likelihood the resource will successfully complete the task; and
schedule the task to be performed by the resource based on the determined likelihood.

2. The scheduler system of claim 1, wherein the processing circuitry is further to determine a specified amount of time has elapsed since the task was last scored, and to re-determine the likelihood the resource will successfully complete the task, the likelihood re-determined by the machine learning model based on a second current time and the feature values.

3. The scheduler system of claim 2, wherein the processing circuitry is further to:
receive an indication, at a time before the specified amount of time has elapsed, that a new feature for the task is available; and
re-determine the likelihood the resource will successfully complete the task, the likelihood re-determined by the machine learning model based on a third current time, the feature values, and a feature value for the new feature.

4. The scheduler system of claim 2, wherein:
the at least one memory device includes a second memory device; and
the processing circuitry is further to:
in response to a determination that a specified period of time has elapsed, access data stored in the second memory device during the specified period of time; and
extract second features from the accessed data and store the second features in the first memory device.

5. The scheduler system of claim 1, wherein the processing circuitry is further to evaluate, by a first technique and while the scheduler system is offline, whether the machine learning model generates sufficiently accurate predictions of likelihood.

6. The scheduler system of claim 5, wherein the processing circuitry is further to evaluate, by a second technique and while the scheduler system is online, whether the machine learning model generates sufficiently accurate predictions of likelihood, the second technique different from the first technique.

7. The scheduler system of claim 6, further comprising:
a third memory device including historical data stored thereon that was generated before the data stored on the second memory device was generated; and
wherein the processing circuitry is further to, in response to a determination by the first technique or the second technique that the machine learning model does not generate sufficiently accurate predictions of likelihood, re-train the machine learning model based on data from the first, second, and third memory devices.

8. The scheduler system of claim 1, further comprising a fourth memory device including the likelihood indexed by task identification stored thereon, the fourth memory device local to the processing circuitry.

9. The scheduler system of claim 1, wherein the schedule is a call schedule for sales call resources to place calls to product sales leads.

10. The scheduler system of claim 9, wherein the features include phone call features indicating lead information features gathered on prior calls placed to the product sales leads, the lead information features indicating information of the product sales leads.

11. The scheduler system of claim 10, wherein:
the phone call features include a lead identification that uniquely identifies the lead, a date a phone call was placed, a time the phone call started, a time the phone call ended, a disposition of the phone call, a description of the phone call, a topic of the phone call, and an identification of an operator receiving or placing the phone call; and
the lead information features include the lead identification, a date the lead was created, business phone number or other phone number of the lead, a company with which the lead is associated, a country in which the lead is located, an email address of the lead, a name of the lead, a job title of an occupation of the lead, a tactic name associated with the lead, a status of the lead, and a priority of the lead.

12. The scheduler system of claim 1, wherein the machine learning model includes a gradient boost tree model.

13. A non-transitory machine-readable medium including instructions that, when executed by a machine, configure the machine to perform operations of a sales lead call scheduler, the operations comprising:
identifying features of a task, the features including a time-dependent feature and a time-independent feature, the time-dependent feature indicating a time between a current time and time a sales lead was identified;
converting the features to feature values based on a predefined mapping of features to feature values in a first memory device;
determining, using a supervised machine learning model and based on a first current time and the feature values, a likelihood the resource will successfully complete the task; and
scheduling the task to be performed by the resource based on the determined likelihood.

14. The non-transitory machine-readable medium of claim 13, wherein the operations further include determining a specified amount of time has elapsed since the task was last scored and re-determining the likelihood the resource will successfully complete the task, the likelihood re-determined by the machine learning model based on a second current time and the feature values.

15. The non-transitory machine-readable medium of claim 14, wherein the operations further include:
receiving an indication, at a time before the specified amount of time has elapsed, that a new feature for the task is available; and
re-determining the likelihood the resource will successfully complete the task, the likelihood re-determined using the machine learning model based on a third current time, the feature values, and a feature value for the new feature.

16. The non-transitory machine-readable medium of claim 14, wherein the operations further comprise:
in response to determining a specified period of time has elapsed, access data stored in the second memory device during the specified period of time; and
extract second features from the accessed data and store the second features in the first memory device.

17. A method of scheduling a resource to perform a task by a scheduler system, the method comprising:
- identifying features of the task, the features including a time-dependent feature and a time-independent feature, the time-dependent feature indicating a time the task is more likely to be successfully completed by the resource;
- converting the features to feature values based on a predefined mapping of features to feature values in a first memory device;
- determining, by a gradient boost tree model and based on a first current time and the feature values, a likelihood the resource will successfully complete the task; and
- scheduling the task to be performed by the resource based on the determined likelihood.

18. The method of claim 17, further comprising evaluating, by an offline technique, whether the machine learning model is generating sufficiently accurate predictions of likelihood.

19. The method of claim 18, further comprising evaluating, by an online technique, whether the machine learning model is generating sufficiently accurate predictions of likelihood, the offline technique different from the online technique.

20. The method of claim 19, wherein the scheduler system includes first, second, and third memory devices, the first memory device including feature values that represent values of respective features based on a predefined one-to-one mapping of features to feature values stored thereon, the second memory device including data stored received during the specified period of time stored thereon, and the third memory device including historical data stored thereon that was generated before the data stored on the second memory device was generated; and
- the method further includes, in response to a determination by the first technique or the second technique that the machine learning model is not generating sufficiently accurate predictions of likelihood, re-training the machine learning model based on data from the first, second, and third memory devices.

* * * * *